United States Patent [19]
Roberts

[11] Patent Number: 5,140,948
[45] Date of Patent: Aug. 25, 1992

[54] VENTED CAT LITTER BOX APPARATUS

[76] Inventor: Nicholas A. Roberts, 1306 Barford Dr., Liberty, Mo. 64068

[21] Appl. No.: 835,523

[22] Filed: Feb. 14, 1992

[51] Int. Cl.⁵ ................................................ A01K 1/02
[52] U.S. Cl. ...................................... 119/165; 119/19
[58] Field of Search .............. 119/161, 163, 165, 166, 119/167, 168, 15, 19, 17

[56] References Cited

U.S. PATENT DOCUMENTS

| | | | |
|---|---|---|---|
| 2,898,691 | 8/1959 | Moseman et al. | 119/19 |
| 3,985,102 | 10/1976 | Yonezawa | 119/19 |
| 4,522,150 | 6/1985 | Gershman | 119/165 |
| 4,559,903 | 12/1985 | Bloom et al. | 119/19 |

Primary Examiner—Gene Mancene
Assistant Examiner—Thomas Price
Attorney, Agent, or Firm—Leon Gilden

[57] ABSTRACT

An enclosure defining a litter box is arranged, with the enclosure including a base portion and removable upper portion mounted to the base portion. A door to the upper portion includes a signal generating switch to effect actuation of a blower motor positioned coaxially within an exhaust conduit directed through the upper portion.

4 Claims, 4 Drawing Sheets

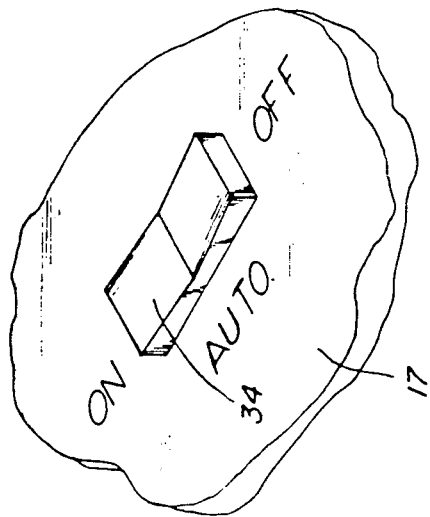
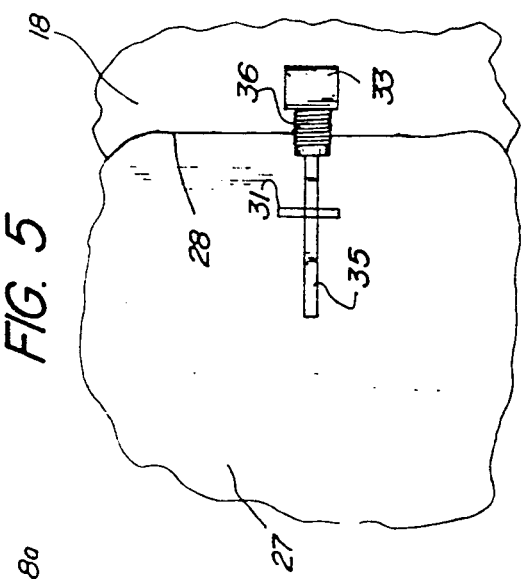
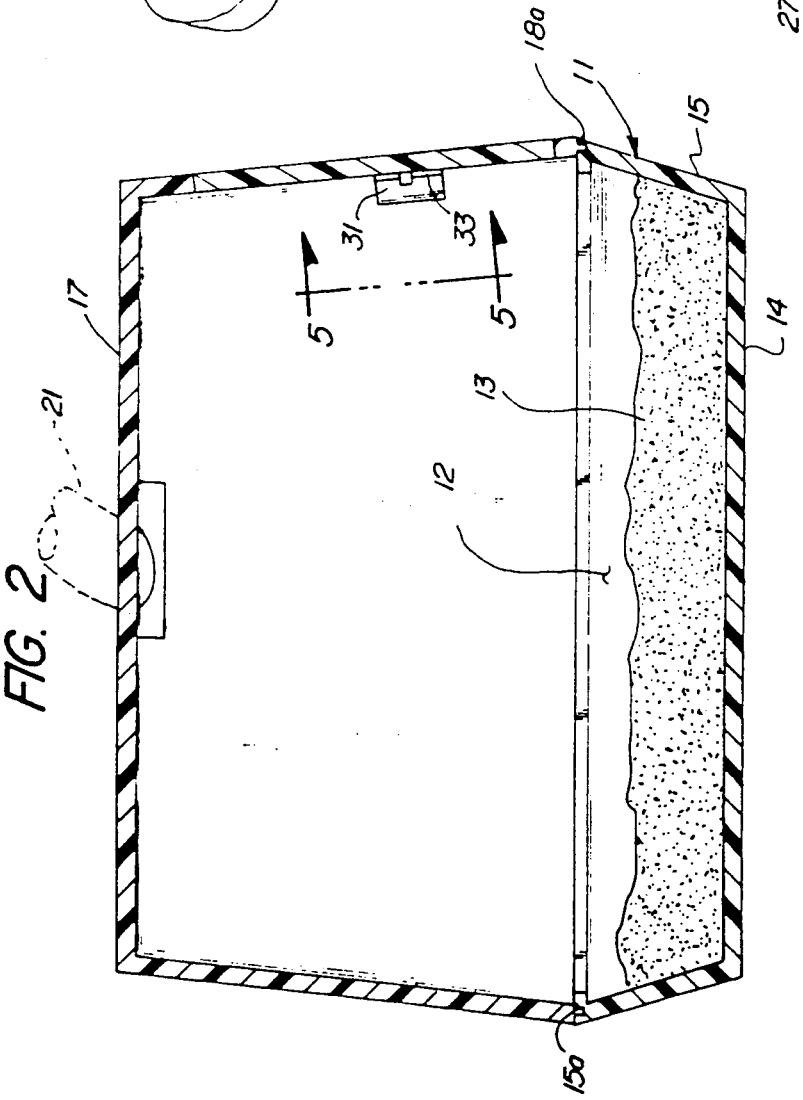

FIG. 3
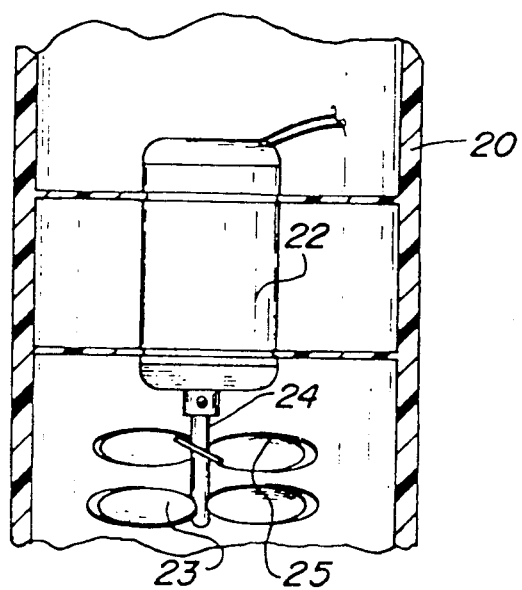
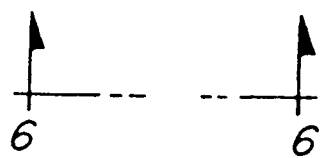
FIG. 6
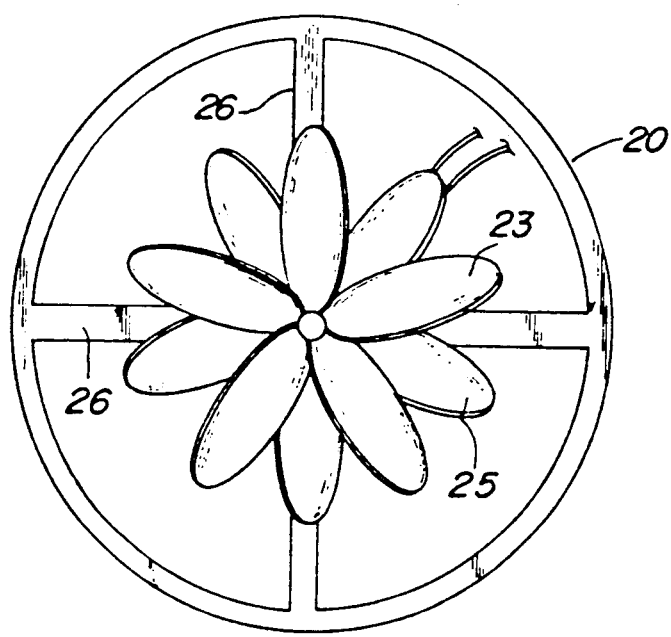

VENTED CAT LITTER BOX APPARATUS

BACKGROUND OF THE INVENTION

1. Field of the Invention

The field of invention relates to litter box structure, and more particularly pertains to a new and improved vented cat litter box apparatus wherein the same is arranged to effect air circulation through a litter box for venting of undesirable odors therefrom.

2. Description of the Prior Art

Litter box apparatus of various types has been utilized throughout the prior art, wherein the undesirable odors associated with litter box usage is known in the prior art and addressed in the U.S. Pat. No. 4,095,559 to Griffith wherein a ventilated litter box includes apertures directed in surrounding relationship relative to granular material, with the apertures directed into a manifold, with an exhaust conduit in communication with the manifold for adjusting air therefrom.

The U.S. Pat. Nos. 4,667,622; 3,990,397; 4,869,204; and 4,884,526 are further examples of litter box structure for containing granular litter box material for cat and the like.

Accordingly, it may be appreciated that there continues to be a need for a new and improved vented cat litter box apparatus as set forth by the instant invention which addresses both the problems of ease of use as well as effectiveness in construction not addressed in the prior art and in this respect, the present invention substantially fulfills this need.

SUMMARY OF THE INVENTION

In view of the foregoing disadvantages inherent in the known types of litter box apparatus now present in the prior art, the present invention provides a vented cat litter box apparatus wherein the same is arranged to direct air through an enclosure, with the enclosure including granular anhydrous litter material positioned within a bottom surface of the enclosure. As such, the general purpose of the present invention, which will be described subsequently in greater detail, is to provide a new and improved vented cat litter box apparatus which has all the advantages of the prior art litter box apparatus and none of the disadvantages.

To attain this, the present invention provides an enclosure defining a litter box, with the enclosure including a base portion and removable upper portion mounted to the base portion. A door to the upper portion includes a signal generating switch to effect actuation of a blower motor positioned coaxially within an exhaust conduit directed through the upper portion.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vented cat litter box apparatus which has all the advantages of the prior art cat litter box apparatus and none of the disadvantages.

It is another object of the present invention to provide a new and improved vented cat litter box apparatus which may be easily and efficiently manufactured and marketed.

It is a further object of the present invention to provide a new and improved vented cat litter box apparatus which is of a durable and reliable construction.

An even further object of the present invention is to provide a new and improved vented cat litter box apparatus which is susceptible of a low cost of manufacture with regard to both materials and labor, and which accordingly is then susceptible of low prices of sale to the consuming public, thereby making such vented cat litter box apparatus economically available to the buying public.

Still yet another object of the present invention is to provide a new and improved vented cat litter box apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic view, taken along the lines 2—2 of FIG. 1 in the direction indicated by the arrows.

FIG. 3 is an orthographic view, taken along the lines 3—3 of FIG. 1 in the direction indicated by the arrows.

FIG. 4 is an isometric illustration of section 4, as set forth in FIG. 1.

FIG. 5 is an orthographic view, taken along the lines 5—5 of FIG. 2 in the direction indicated by the arrows.

FIG. 6 is an orthographic view, taken along the lines 6—6 of FIG. 5 in the direction indicated by the arrows.

DESCRIPTION OF THE PREFERRED EMBODIMENT

Figure 1:
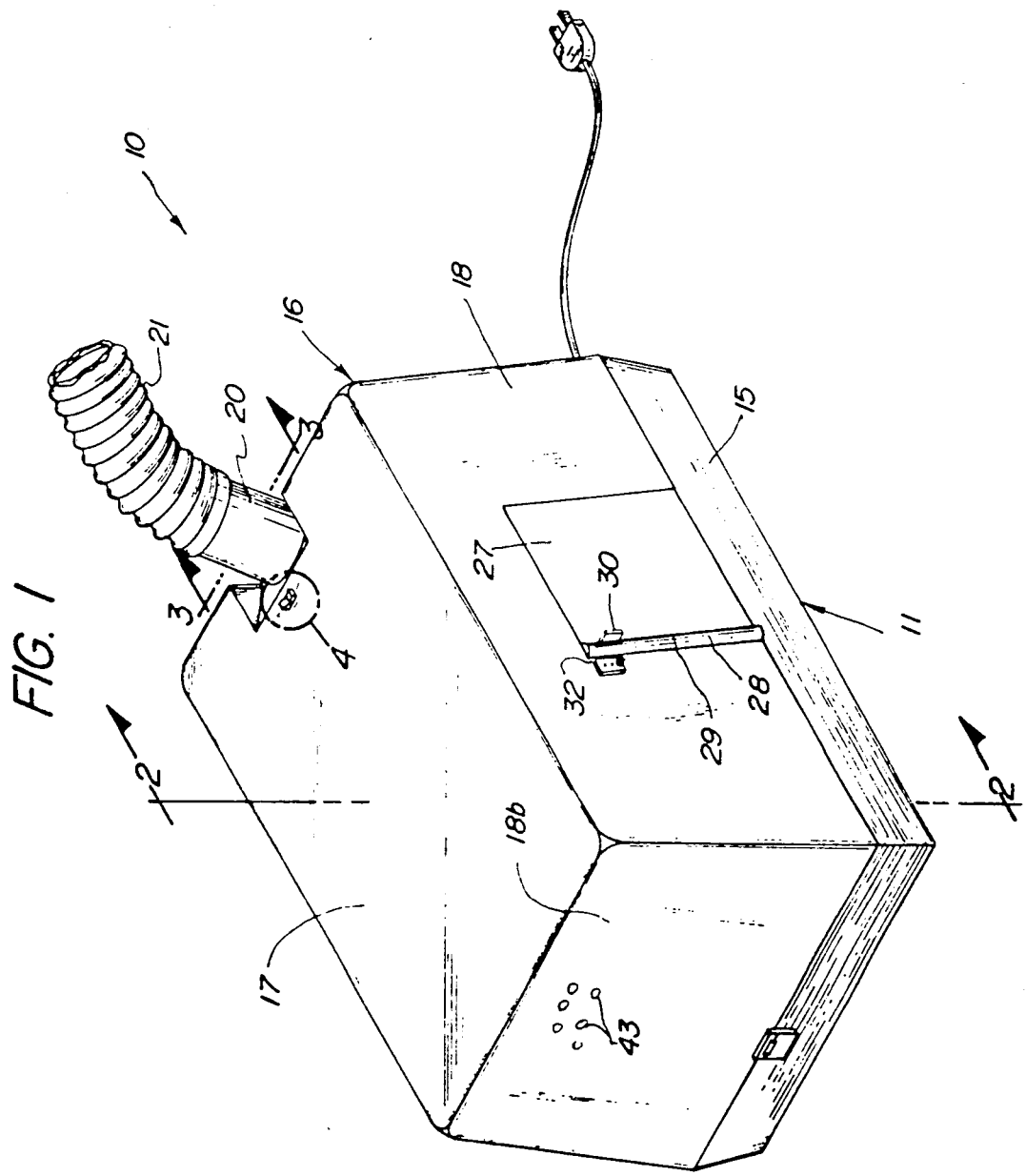
FIG. 1 is an isometric illustration of the instant invention.
Figure 8:
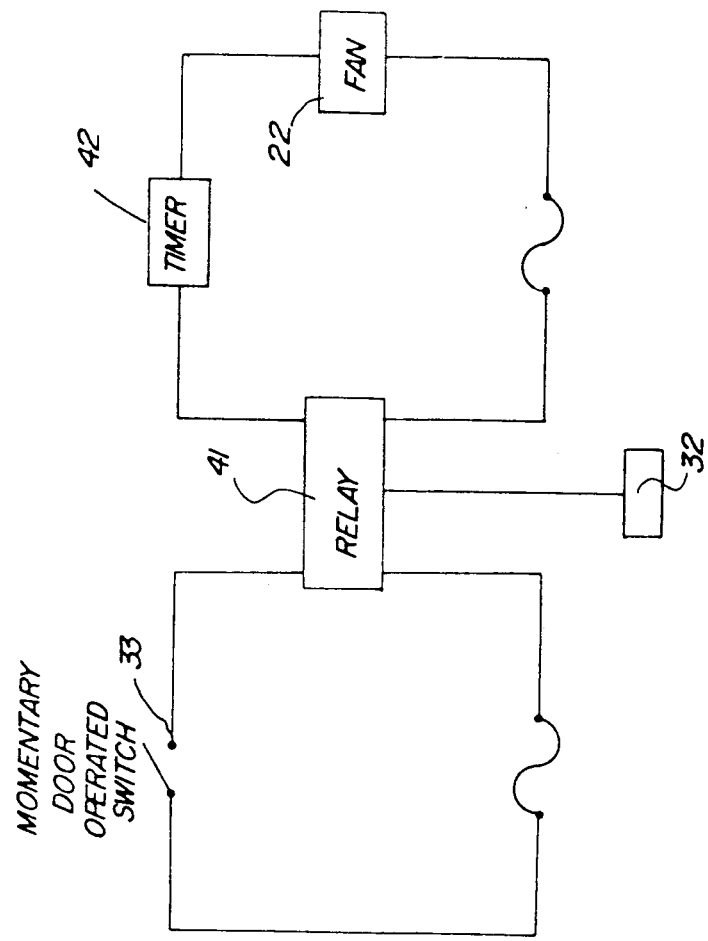
FIG. 8 is a diagrammatic illustration of the switch components of the instant invention.

With reference now to the drawings, and in particular to FIGS. 1 to 8 thereof, a new and improved vented cat litter box apparatus embodying the principles and concepts of the present invention and generally designated by the reference numeral 10 will be described.

More specifically, the vented cat litter box apparatus 10 of the instant invention essentially comprises a base housing 11, including a base housing cavity 12 defined by the base housing floor 14 (see FIG. 2) and the base housing continuous side wall 15 terminating in an upper end projection 15a. An anhydrous particulate material 13 is positioned within the base housing cavity 12. A cover housing 16 is provided including a cover housing top wall 17 and a cover housing continuous side wall 18 terminating in a lower groove 18a to receive the base housing end projection to secure the base housing 11 to the cover housing 16. As required, latches as illustrated in FIG. 1 may be secured to an intersection of the base housing side wall 15 and the cover housing side wall 18 to secure the components together. A cover housing rigid conduit 20 is directed into the cover housing through an intersection of the cover housing top wall 17 and a forward wall. The rigid conduit 20 is secured to a flexible extension conduit 21 to be directed exteriorly of the dwelling and the like for venting of fumes within the apparatus 10. A rear end wall 18b spaced from the forward end wall includes a matrix of rear end wall apertures 43 directed therethrough to provide air flow through the apparatus. A blower motor 22 is fixedly mounted coaxially within the rigid conduit 20 utilizing mounting webs 26 that are diametrically directed and fixedly secured to the blower motor and the rigid conduit 20. The blower motor includes an output shaft 24 including a plurality of first impeller blades mounted concentrically relative to the output shaft 24, with the first impeller blades 23 positioned in an offset relationship above a plurality of second impeller blades 25 mounted fixedly and concentrically to the output shaft 24. The FIG. 4 illustrates the use of a three-way switch 34, to include an on, off, and automatic position, wherein in the automatic position, the act of a cat being directed through the cover housing door 27 that is mounted to a cover housing door hinge to the cover housing side wall 18 effects actuation of the blower motor. The hinge 28 is orthogonally oriented relative to the lower groove 18a, and the door 27 including a door rear edge 29 in communication with the hinge 28. A first abutment flange 30 mounted orthogonally relative to the door rear edge 29 is arranged for actuation of a first contact switch 32 mounted to the slide wall adjacent the hinge to effect contact with the first abutment flange 30, wherein through a relay 41 effects actuation of the blower motor 22 through a timer mechanism 42 to maintain operation of the blower motor for a prolonged period of time subsequent to displacement of the door 27. A second contact switch 33, including a contact finger 35 fixedly mounted to an interior surface of the door 27 by means of a second lock flange 31, is mounted to a spring member 36, that in turn is mounted to the second switch 33. The spring member 36 maintains the door in a coplanar relationship relative to the cover housing side wall 16.

Figure 7:
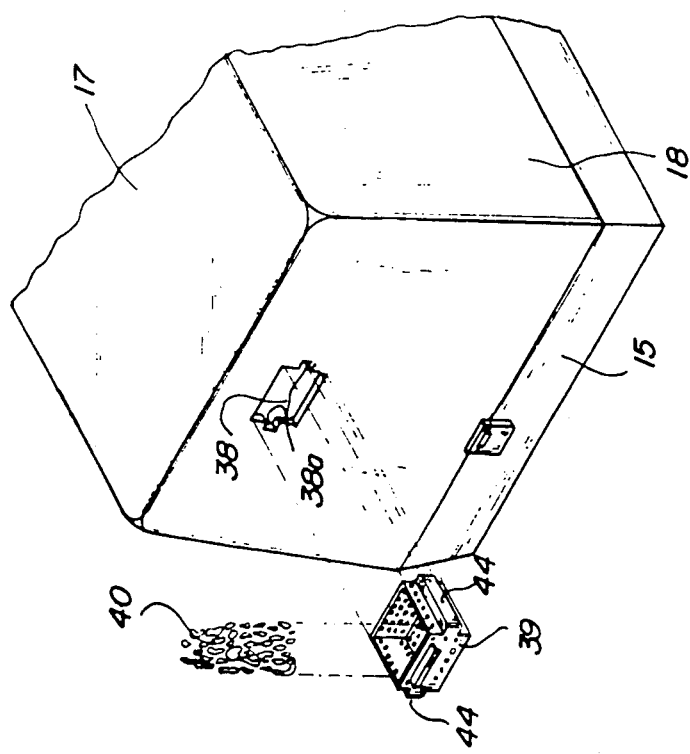
FIG. 7 is an isometric illustration of a modified rear end wall of the cover housing of the instant invention.

The FIG. 7 illustrates the use of a cover housing rear end wall opening 38 in lieu of the rear end wall apertures 43, wherein the cover housing rear end wall 38 includes a plurality of rear end wall slots 38a positioned on opposed sides of the opening 38 to receive container side wall ribs, with a single rib 44 directed through an associated single slot 38a. The ribs 44 are mounted to oppose sides of a perforated support container 39 to have positioned therewithin a scented particulate 40 to enhance and effect deodorizing of air within the apparatus 10 during venting of air from the apparatus within the cover housing 16 directing air through the perforated support container 39 during use of the blower motor 22.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A vented cat litter box apparatus, comprising, a base housing, the base housing including a base housing floor, with the base housing further including a base housing container side wall extending in surrounding relationship relative to the floor defining a base housing cavity therewithin, and an anhydrous particulate material mounted within the base housing cavity, and the base housing including a cover housing selectively secured to the base housing, the cover housing including a cover housing top wall, a cover housing continuous side wall in contiguous communication with the base housing side wall, and a rigid conduit mounted to the cover housing directed through the cover housing at an intersection of the cover housing top wall and the cover housing forward side wall, the cover housing rear side wall including apertures for directing air flow through the cover housing, and a blower motor mounted within the rigid conduit for evacuating air from within the cover housing, the base housing side wall includes a base housing upper end projection, and the cover housing continuous side wall includes a cover housing lower groove for receiving the upper end projection, and a door hingedly mounted through the cover housing side wall between the forward end wall and the rear end wall, and the door including a hinge, the hinge orthogonally oriented relative to the cover housing continuous side wall groove, and an abutment flange orthogonally and fixedly mounted to the door to a rear edge of the door adjacent the hinge, and a first contact switch mounted to the cover housing side wall adjacent the hinge for communication with the first abutment flange upon opening of the door outwardly relative to the cover housing, and a second contact switch mounted to an interior surface of the cover housing positioned adjacent the door, with the second contact switch including a contact finger, the contact finger including a spring member mounted to a rea distal end of the contact finger and to the second contact switch, with the contact finger to an interior surface of the door to bias the door in a coplanar relationship relative to the cover housing side wall, wherein the first contact switch and the second contact switch are in operative communication with the blower motor for effecting selective actuation of the blower motor.

2. An apparatus as set forth in claim 1 wherein the blower motor includes an output shaft coaxially aligned within the rigid conduit, and a mounting web diametrically directed across and within the rigid conduit for securing the blower motor in a coaxially aligned relationship within the rigid conduit, and the blower motor including the output shaft formed with a plurality of first impeller blades mounted concentrically about the output shaft, and a plurality of a second impeller blades mounted concentrically about the output shaft and below the first impeller blades, the second impeller blades radially offset relative to the first impeller blades about the output shaft.

3. An apparatus as set forth in claim 1 including a timer in electrical communication with the first contact switch and the second contact switch to effect timed actuation of the blower motor.

4. An apparatus as set forth in claim 3 wherein the rear wall apertures are directed into a perforated support container, and the cover housing rear end wall includes a rear end wall opening, the rear end wall opening includes opposed rear end wall opening slots, and the perforated support container includes support container ribs mounted to opposed side of the support container, wherein at least one of said ribs is received within at least one of said slots, and a scented particulate material positioned within the perforated support container.

* * * * *